(12) United States Patent
Matsumoto (10) Patent No.: US 8,673,465 B2
(45) Date of Patent: Mar. 18, 2014

(54) MAGNETIC RECORDING MEDIUM, METHOD OF FABRICATING THE SAME, AND STORAGE APPARATUS

(75) Inventor: Koji Matsumoto, Kawaguchi (JP)

(73) Assignee: Showa Denko K.K., Tokyo (JP)

( * ) Notice: Subject to any disclaimer, the term of this patent is extended or adjusted under 35 U.S.C. 154(b) by 584 days.

(21) Appl. No.: 12/640,939

(22) Filed: Dec. 17, 2009

(65) Prior Publication Data

US 2010/0226041 A1 Sep. 9, 2010

(30) Foreign Application Priority Data

Dec. 19, 2008 (JP) ................................ 2008-324451

(51) Int. Cl.
*G11B 5/65* (2006.01)
*G11B 5/667* (2006.01)

(52) U.S. Cl.
USPC ........................... 428/836; 428/831; 360/135

(58) Field of Classification Search
None
See application file for complete search history.

(56) References Cited

U.S. PATENT DOCUMENTS

| 2005/0186450 A1* | 8/2005 | Takenoiri et al. | ............. 428/827 |
| 2007/0026261 A1* | 2/2007 | Marinero et al. | .......... 428/831.2 |
| 2007/0281078 A1* | 12/2007 | Kikitsu et al. | ................ 427/127 |
| 2008/0090104 A1* | 4/2008 | Sonobe et al. | ................ 428/800 |
| 2008/0137231 A1* | 6/2008 | Lim et al. | ...................... 360/131 |

FOREIGN PATENT DOCUMENTS

| JP | 10-125520 A | 5/1998 |
| JP | 2008-146809 A | 6/2008 |

* cited by examiner

*Primary Examiner* — Kevin Bernatz
(74) *Attorney, Agent, or Firm* — Sughrue Mion, PLLC (57) ABSTRACT

A magnetic recording medium includes a recording layer having a granular structure in which magnetic particles are dispersed within a non-magnetic base, and a non-magnetic material embedded in grooves of patterns formed on the recording layer. The magnetic particles have an inverted truncated cone shape with a diameter larger in an upper region of the recording layer than in a lower region of the recording layer.

12 Claims, 13 Drawing Sheets

MAGNETIC RECORDING MEDIUM, METHOD OF FABRICATING THE SAME, AND STORAGE APPARATUS

CROSS-REFERENCE TO RELATED APPLICATIONS

This application claims the benefit of a Japanese Patent Application No. 2008-324451 filed on Dec. 19, 2008, in the Japanese Patent Office, the disclosure of which is hereby incorporated by reference.

BACKGROUND OF THE INVENTION

1. Field of the Invention

The present invention generally relates to magnetic recording media, methods of fabricating the same, and storage apparatuses, and more particularly to a magnetic recording medium which is often referred to as discrete track media, a method of fabricating such a magnetic recording medium, and a storage apparatus having such a magnetic recording medium.

2. Description of the Related Art

In storage apparatuses that are used as external storages of computers and the like, there have been rapid improvements in the recording densities of magnetic recording media. In order to achieve a high recording density, it is necessary to improve the Signal-to-Noise Ratio (SNR), and the reduction of transition noise is one of the important goals to be achieved. The transition noise depends on the size of magnetic particles forming a recording layer of the magnetic recording medium, and the smaller the magnetic particle diameter the more the transition noise can be suppressed. However, the reduction in the magnetic particle diameter causes the resistance to thermal instability of written information, that is, the thermal stability of written information, to deteriorate. For this reason, the material used to form the recording layer needs to have a high magnetic anisotropy energy, and consequently, there is a problem in that it becomes difficult for a magnetic head to write information on the magnetic recording medium.

The so-called patterned media have been proposed to avoid the problem described above. The patterned media include Discrete Track Media (DTM), Bit Patterned Media (BPM) and the like. The DTM has a structure in which the recording layer is physically isolated in a track direction. The BPM has a structure in which the recording layer is physically isolated in both the track direction and a bit direction. The DTM can improve the track density, while the BPM can improve both the track density and the line density.

As a method of forming patterns on the recording layer of the patterned medium, there is a proposed method which fabricates a stamper by the lithography technique using electron beam plotting or the like, and pushes the stamper against a resist formed on the recording layer in order to transfer patterns onto the resist. This proposed method thereafter carries out a dry etching to form the patterns on the recording layer.

The magnetic head writes information on and reads information from the patterned medium in a state where the magnetic head floats from the patterned medium by a predetermined distance. For this reason, in order to prevent damage to the magnetic head or the patterned medium due to contact between the magnetic head and the patterned medium, the medium surface of the patterned medium needs to be flat or planar. Hence, after forming the patterns on the recording layer in the manner described above, grooves of the patterns need to be filled, for example, to planarize the medium surface. A method has been proposed to fill the grooves of the patterns by a non-magnetic material such as $SiO_2$, and to thereafter planarize the medium surface by a Chemical Mechanical Polishing (CMP).

In order to further improve the recording density of the patterned medium, it is necessary to reduce the size of the magnetic particles forming the recording layer, however, the patterned medium is easily affected by the thermal instability if the magnetic particles are small. In addition, when forming the patterns on the recording layer of the patterned medium by the etching carried out in the manner described above, portions of the magnetic particles at an etching boundary are etched to locally reduce the volume of the magnetic particles, and the patterned medium is easily affected by the thermal instability.

The applicant is aware of Japanese Laid-Open Patent Publications No. 10-125520 and No. 2008-146809.

Accordingly, there is a problem in that the conventional patterned medium is easily affected by the thermal instability because the volume of the magnetic particles forming the recording layer is locally reduced when the recording layer is patterned.

SUMMARY OF THE INVENTION

Accordingly, it is a general object of the present invention to provide a novel and useful magnetic recording media, methods of fabricating the same, and storage apparatuses, in which the problems described above are suppressed.

Another and more specific object of the present invention is to provide a magnetic recording medium, a method of fabricating the same, and a storage apparatus, which can suppress local reduction in the volume of the magnetic particles forming the recording layer when the recording layer is patterned, in order to make the magnetic recording medium less easily affected by the thermal instability.

According to one aspect of the present invention, there is provided a magnetic recording medium comprising a recording layer having a granular structure in which magnetic particles are dispersed within a non-magnetic base, the recording layer having patterns with grooves formed thereon; and a non-magnetic material embedded in the grooves of the patterns on the recording layer, wherein the magnetic particles have an inverted truncated cone shape with a diameter larger in an upper region of the recording layer than in a lower region of the recording layer.

According to one aspect of the present invention, there is provided a method of fabricating a magnetic recording medium, comprising forming a recording layer having a granular structure in which magnetic particles are dispersed within a non-magnetic base; patterning the recording layer to form patterns with grooves on the recording layer; and filling a non-magnetic material in the grooves of the recording layer, wherein the forming forms the magnetic particles to an inverted truncated cone shape with a diameter larger in an upper region of the recording layer than in a lower region of the recording layer.

According to one aspect of the present invention, there is provided a storage apparatus comprising a magnetic recording medium; and a head configured to write information on and to read information from the magnetic recording medium, the magnetic recording medium comprising a recording layer having a granular structure in which magnetic particles are dispersed within a non-magnetic base, the recording layer having patterns with grooves formed thereon; and a non-magnetic material embedded in the grooves of the patterns on the recording layer, wherein the magnetic particles have an inverted truncated cone shape with a diameter larger in an upper region of the recording layer than in a lower region of the recording layer.

Other objects and further features of the present invention will be apparent from the following detailed description when read in conjunction with the accompanying drawings.

DESCRIPTION OF THE PREFERRED EMBODIMENTS

In the magnetic recording medium, the method of fabricating the same, and the storage apparatus disclosed hereunder, a recording layer of the magnetic recording medium has a granular structure in which magnetic particles (or magnetic grains) are dispersed or scattered within a non-magnetic base (or non-magnetic base material). The granular structure of the recording layer promotes isolation of the magnetic particles in the recording layer, and the medium noise can be reduced and the resistance to thermal instability can be improved by increasing the coercivity of the recording layer. In addition, by suitably selecting a granular oxide that is used for the recording layer, the magnetic particles in the recording layer can be formed to have an inverted truncated cone shape having an area that is greater on the upper surface side compared to that on the lower surface side of the recording layer.

Because the magnetic particles forming the recording layer have the inverted truncated cone shape, it is possible to improve the resistance to thermal instability or, reduce the recording magnetic field, even if the magnetic particles are made relatively large. Moreover, since the film thickness of the recording layer can be relatively thin, it is possible to shorten an etching time required to pattern the recording layer and to shorten a time required to fill grooves of the patterns by a non-magnetic material. Furthermore, even in a case where the magnetic particles in the recording layer are etched in a direction that is inclined with respect to a direction perpendicular to a substrate surface when patterning the recording layer, it is possible to suppress local reduction in the volume of the magnetic particles from becoming locally reduced.

A description will hereinafter be given of the magnetic recording medium, the method of fabricating the same, and the storage apparatus in each of embodiments of the present invention, by referring to the drawings.

Figure 1:
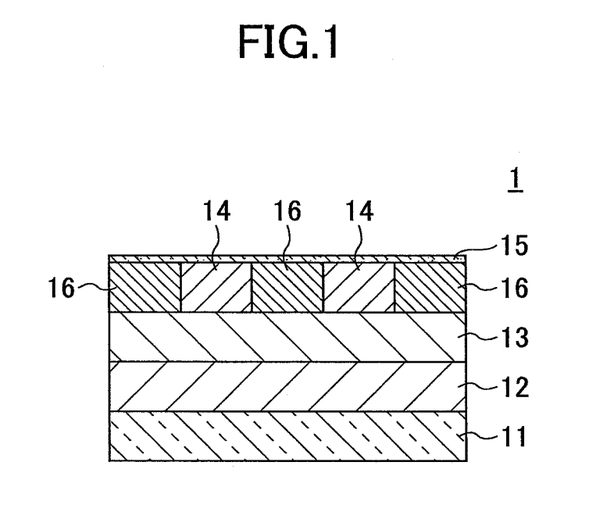
FIG. 1 is a cross sectional view illustrating a portion of a magnetic recording medium in an embodiment of the present invention.

FIG. 1 is a cross sectional view illustrating a portion of the magnetic recording medium in an embodiment of the present invention. A magnetic recording medium 1 illustrated in FIG. 1 includes a substrate 11, a soft magnetic layer 12, an intermediate layer 13, a recording layer 14, and a protection layer 15. This magnetic recording medium 1 is the so-called patterned medium in which a non-magnetic material 16 is embedded in grooves of patterns formed on the recording layer 14. Because the present invention is applied to a disk-shaped DTM in this embodiment, the recording layer 14 and the non-magnetic material 16 are formed concentrically and are arranged alternately along a radial direction of the magnetic recording medium 1. In a case where the present invention is applied to a disk-shaped BMP, for example, the recording layer 14 and the non-magnetic material 16 are formed alternately along a track direction (that is, a circumferential direction) and are arranged alternately along the radial direction of the magnetic recording medium 1.

For example, the substrate 11 is made of glass having a relatively strong mechanical strength and a flat surface, Al that has been subjected to a surface processing, and the like. For example, the soft magnetic layer 12 is made of a Co-based amorphous material such as CoZrNb and CoZrTa or, a Fe-based amorphous material such as FeCoB and FeTaC. The soft magnetic layer 12 may have a stacked structure. For example, a CoZrNb layer, a Ru layer, and a CoZrNb layer may be successively stacked to form a stacked structure CoZrNb/Ru/CoZrNb of the soft magnetic layer 12.

The intermediate layer 13 may have a stacked structure. For example, a NiFe layer and a Ru layer may be successively stacked to form a stacked structure NiFe/Ru of the intermediate layer 13 or, a Ta layer and a Ru layer may be successively stacked to form a stacked structure Ta/Ru of the intermediate layer 13. In the case of the intermediate layer 13 having the stacked structure NiFe/Ru, the film thickness of the NiFe layer is 5 nm and the film thickness of the Ru layer is 15 nm, for example. In the case of the intermediate layer 13 having the stacked structure Ta/Ru, the film thickness of the Ta layer is 4 nm and the film thickness of the Ru layer is 20 nm, for example. The NiFe layer or the Ta layer of the intermediate layer 13 having the stacked structure may improve the crystallinity and/or control the particle diameter of the Ru layer. On the other hand, the Ru layer of the intermediate layer 13 having the stacked structure may cause the axis of easy magnetization of the recording layer 14 to become oriented or aligned in a direction perpendicular with respect to a surface of the substrate 11. The surface of the substrate 11 will hereinafter also be referred to as a "substrate surface".

The recording layer 14 has a granular structure in which magnetic particles are dispersed or scattered within a non-magnetic base. In this embodiment, the non-magnetic base is formed by a metal oxide such as $TiO_2$, and the magnetic particles are CoCrPt, for example. Preferably, in order to magnetically isolate each magnetic particle in a lower region of the recording layer 14, the magnetic particle size is uniform and the metal oxide such as $SiO_2$ sufficiently fills gaps between the magnetic particles. The magnetic particles and the metal oxide in the lower region of the recording layer 14 are 85 mol % ($Co_{65}Cr_{15}Pt_{20}$) and 15 mol % ($TiO_2$), for example.

In an intermediate region of the recording layer 14, the metal oxide is reduced from 15 mol % ($TiO_2$) to 12 mol % ($TiO_2$), so that magnetic coupling of the magnetic particles slightly occurs. The film thickness of the lower region, the intermediate region and an upper region of the recording layer 14 may vary depending on the characteristics or properties required of the magnetic recording medium 1 or the materials used for the magnetic recording medium 1. But in a case where the film thickness of the recording layer 14 is 15 nm, for example, the lower region, the intermediate region and the upper region of the recording layer 14 may respectively have a film thickness on the order of approximately 5 nm.

For example, in a case where the film thickness of the recording layer 14 is 15 nm, the magnetic particle diameter is 8 nm, the gap between the magnetic particles is 2 nm, the magnetic particles have a cylindrical shape, and a magnetic anisotropy energy Ku per unit volume is represented by $Ku=4\times10^6$ erg/cc, a KuV/kT value becomes KuV/kT=72.8, where kT denotes a thermal instability energy and V denotes the volume of the magnetic particle. In addition, in a case where the magnetic particle diameter in the lower region of the recording layer 14 is 7 nm and the magnetic particle diameter in the upper region of the recording layer 14 is 0.5 nm, the KuV/kT value becomes KuV/kT=78.1 which shows an increase of approximately 7% compared to the case where the magnetic particles have the cylindrical shape. Furthermore, in a case where the magnetic particle diameter in the lower region of the recording layer 14 is 7.5 nm and the magnetic particle diameter in the upper region of the recording layer 14 is 10 nm, the KuV/kT value becomes KuV/kT=87.7 which shows an increase of approximately 20% compared to the case where the magnetic particles have the cylindrical shape. Accordingly, when the gap between the adjacent magnetic particles in the lower region of the recording layer 14 is large compared to the gap between the adjacent magnetic particles having the cylindrical shape, the magnetic coupling does not occur between the magnetic particles even if the magnetic particle diameter (that is, the magnetic particle size) is non-uniform, and the linear recording density of the magnetic recording medium 1 can be improved.

For example, the protection layer 15 has a stacked structure in which a Diamond-Like Carbon (DLC) layer and a lubricant layer are successively stacked. The lubricant layer may be formed by an organic lubricant, for example.

Next, a description will be given of the method of fabricating the magnetic recording medium (hereinafter also referred to as a "medium fabricating method") in an embodiment of the present invention. The medium fabricating method includes a step (or process) ST1 that processes and/or cleans a surface on which a recording layer is formed, a step (or process) ST2 that forms the recording layer by sputtering a magnetic material, a step (or process) ST3 that forms a protection layer on the recording layer, and a step (or process) ST4 that tests the fabricated magnetic recording medium, similarly to a conventional medium fabricating method that fabricates a magnetic recording medium having a continuous recording layer.

But in this embodiment, the step ST2 forms the recording layer so that the magnetic particles have an inverted truncated cone shape with an upper area that is larger in the upper region than a lower area in the lower region of the recording layer. In addition, steps (or processes) S1 through S3 which will be described later are provided between the steps ST1 and ST3. FIG. 2, FIGS. 3A through 3C, and FIGS. 4A through 4F are cross sectional views for explaining the steps S1, S2 and S3. In FIG. 2, FIGS. 3A through 3C, and FIGS. 4A through 4C, those parts that are the same as those corresponding parts in FIG. 1 are designated by the same reference numerals, and a description thereof will be omitted. Each layer of the magnetic recording layer 1 is formed by an inline sputtering apparatus.

In the step ST1, a $Co_{80}Zr_{10}Nb_{10}$ layer having a film thickness of 20 nm, a Ru layer having a film thickness of 0.8 nm, and a $Co_{80}Zr_{10}Nb_{10}$ layer having a film thickness of 20 nm are successively stacked on a glass substrate 11 having a diameter of 2.5 inches, to form a soft magnetic layer 12 having a stacked structure (or multi-layer structure). The $Co_{80}Zr_{10}Nb_{10}$ layers of the soft magnetic layer 12 are formed by setting an Ar gas pressure to 0.5 Pa and an applied power to 2.1 kW, and the Ru layer of the soft magnetic layer 12 is formed by setting the Ar gas pressure to 0.5 Pa and the applied power to 1.2 kW. In this case, the axis of easy magnetization of the soft magnetic layer 12 is oriented in the radial direction, and the magnetizations of the lower $Co_{80}Zr_{10}Nb_{10}$ layer closer to the substrate 11 and the upper $Co_{80}Zr_{10}Nb_{10}$ layer closer to the intermediate layer 13 are mutually antiparallel. In addition, a NiFe layer having a film thickness of 5 nm and a Ru layer having a film thickness of 15 nm are successively stacked on the soft magnetic layer 12, to form an intermediate layer 13 having a stacked structure (or multi-layer structure). The NiFe layer of the intermediate layer 13 is formed by setting the Ar gas pressure to 1 Pa and the applied power to 1 kW, and the Ru layer of the intermediate layer 13 is formed by setting the Ar gas pressure to 3 Pa and the applied power to 1.3 kW.

In the step ST2, a recording layer 14 having a film thickness of 15 nm is formed by setting the Ar gas pressure to 5 Pa and the applied power to 1.5 kW. The first 5 nm of the recording layer 14 forming the lower region has a composition 85 mol % ($Co_{65}Cr_{15}Pt_{20}$)-15 mol % ($TiO_2$), the next 5 nm of the recording layer 14 forming the intermediate region has a composition 88 mol % ($Co_{65}Cr_{15}Pt_{20}$)-12 mol % ($TiO_2$), and the next 5 nm of the recording layer 14 forming the upper region has a composition 91 mol % ($Co_{65}Cr_{15}Pt_{20}$)-9 mol % ($TiO_2$). In other words, the magnetic particles in the recording layer 14, having the inverted truncated cone shape, has a relatively small magnetic particle diameter by adding a relatively large amount of $TiO_2$ as the granular forming oxide in an initial growth stage of the recording layer 14, but the amount of $TiO_2$ that is added as the granular forming oxide is gradually increased as the growth stage progresses in order to increase the magnetic particle diameter.

Figure 2:
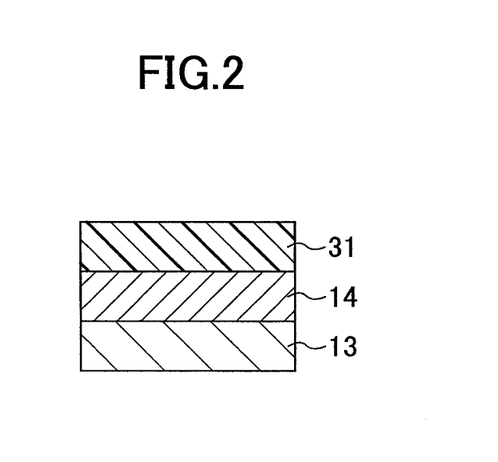
FIG. 2 is a cross sectional view for explaining a step S1.

In the step S1, a resist layer 31 made of an ultraviolet ray setting resin which cures when irradiated with ultraviolet ray and having a film thickness of 40 nm is formed on the recording layer 14 that is formed on the intermediate layer 13, as illustrated in FIG. 2. In FIG. 2, the illustration of the layers under the intermediate layer 12 is omitted for the sake of convenience.

Figure 3A:
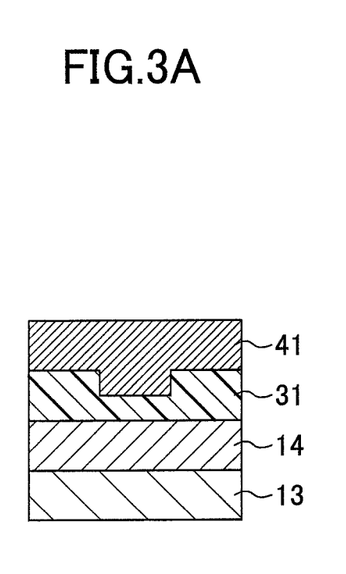
FIGS. 3A through 3C are cross sectional views for explaining a step S2.
Figure 3B:
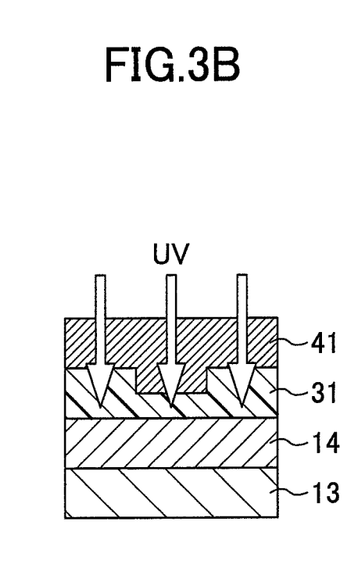
Figure 3C:
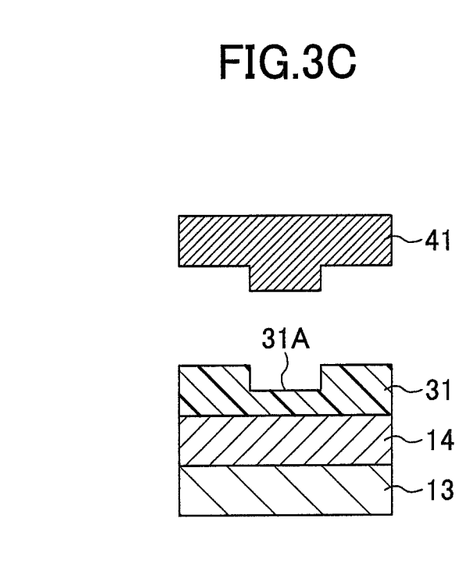

In the step S2, a mold (or stamper) 41 that is made of quartz and has a surface with a concavo-convex shape (hereinafter also referred to as a "concavo-convex surface") in correspondence with a desired pattern is pushed against the resist layer 31 as illustrated in FIG. 3A, in order to transfer the pattern of the mold 41 onto the resist layer 31. For example, a depth of the concavo-convex surface is approximately 70 nm. The pattern of the mold 41 includes a concentric pattern in a data zone of the magnetic recording medium 1, and a servo pattern extends in the radial direction, for example. As illustrated in FIG. 3B, the resist layer 31 is cured (or hardened) by irradiating ultraviolet ray UV thereon for approximately 5 seconds. In addition, when the mold 41 is removed as illustrated in FIG. 3C, the film thickness of the resist layer 31 becomes approximately 90 nm, and a residue 31A in a groove of the resist layer 31 has a film thickness of approximately 8 nm.

Figure 4A:
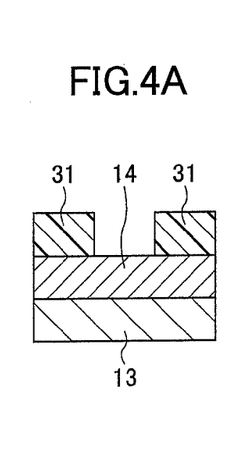
FIGS. 4A through 4F are cross sectional views for explaining a step S3.
Figure 4B:
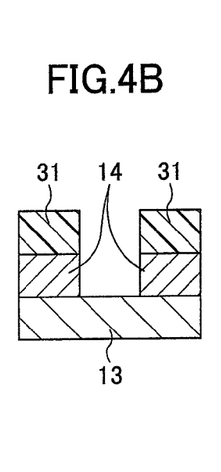
Figure 4C:
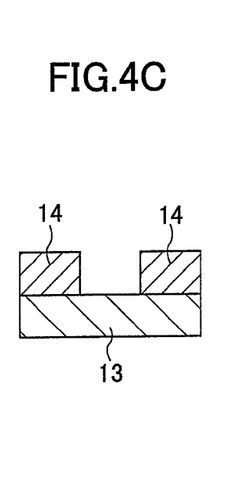
Figure 4D:
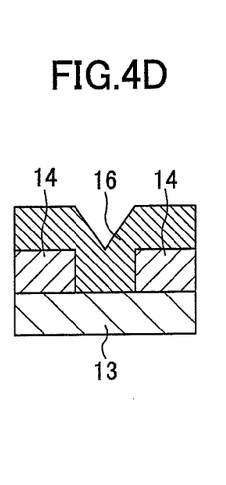
Figure 4E:
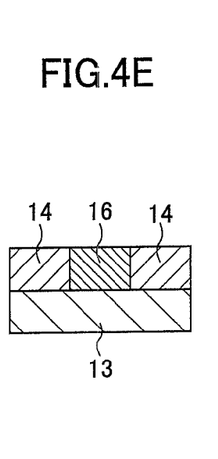
Figure 4F:
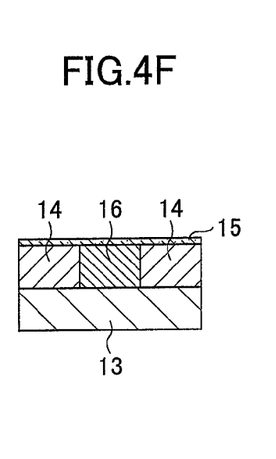
Figure 5:
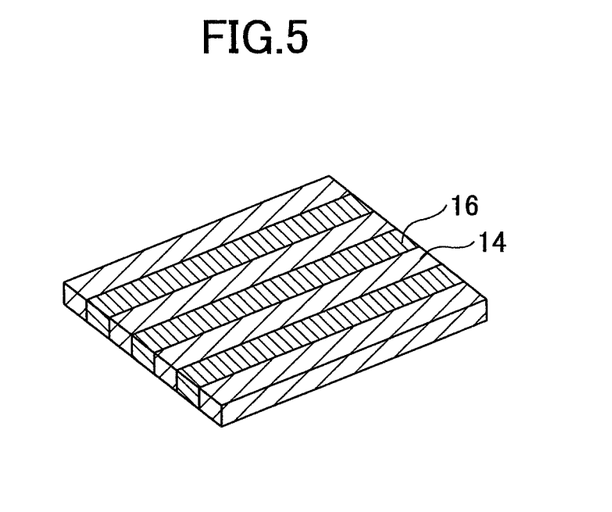
FIG. 5 is a perspective view illustrating a portion of the magnetic recording medium.

In the step S3, approximately 8 nm of the resist layer 31 and the residue 31A thereof are removed by a Reactive Ion Etching (RIE), as illustrated in FIG. 4A. The RIE is carried out by setting a flow rate ratio of Ar gas and $O_2$ gas to 2:1 and the applied power to approximately 500 W. The recording layer 14 becomes exposed in a region of the groove of the resist layer 31 by carrying out this RIE. Next, the resist layer 31 is used as a mask to etch the recording layer 31 by an Ion Beam Etching (IBE) using Ar ions, to remove the recording layer 14 within the groove of the resist layer 31, as illustrated in FIG. 4B. The IBE is carried out by setting an applied RF power to 300 W and a bias voltage to approximately −50 V. Then, the resist layer 31 is removed, as illustrated in FIG. 4C. Furthermore, in order to fill the groove that is formed by the removal of the recording layer 14, a non-magnetic material 16 is formed while applying the bias voltage, as illustrated in FIG. 4D. For example, $Co_{40}Zr_{30}Nb_{30}$ is used for the non-magnetic material 16. Because the non-magnetic material 16 is formed to a film thickness of approximately 10 nm on the recording layer 14, an IBE is carried out to etch the non-magnetic material 16 using the Ar ions, in order to planarize the surface where the recording layer 14 and the non-magnetic material 16 are alternately arranged as illustrated in FIG. 4E. FIG. 5 is a perspective view illustrating a portion of the magnetic recording medium 1 in this state. Since the present invention is applied to the DTM in this embodiment, the recording layer 14 in FIG. 5 corresponds to a land region of the magnetic recording medium 1, and the non-magnetic material 16 corresponds to a groove region of the magnetic recording medium 1. Thereafter, a protection layer 15 is formed on the planarized surface to a film thickness of 3 nm, as illustrated in FIG. 4F. The protection layer 15 includes a DLC layer that is formed to a film thickness of 2 nm on the recording layer 14, and a lubricant layer that is formed on the DLC layer to a thickness of 1 nm by a dipping technique using perfluoropolyether (PFPE).

Next, a description will be given of the effects that are obtained by making the magnetic particles within the recording layer 14 having the granular structure have the inverted truncated cone shape, by referring to FIGS. 6A through 8B.

Figure 6A:
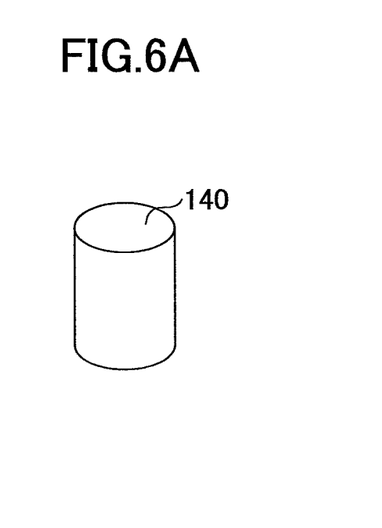
FIGS. 6A and 6B are diagrams for explaining shapes of magnetic particles within a recording layer.
Figure 6B:
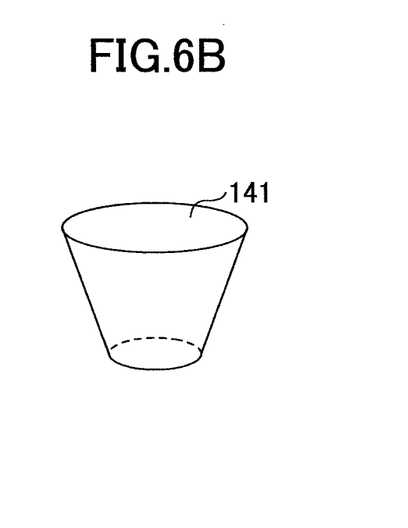

FIGS. 6A and 6B are diagrams for explaining shapes of the magnetic particles within the recording layer 14. FIG. 6A illustrates a magnetic particle 140 having a cylindrical shape, and FIG. 6B illustrates a magnetic particle 141 having an inverted truncated cone shape. As may be seen from FIGS. 6A and 6B, although the areas of the lower surfaces of the magnetic particles 140 and 141 are the same, the volume of the magnetic particle 141 can be made larger than that of the magnetic particle 140.

Figure 7A:
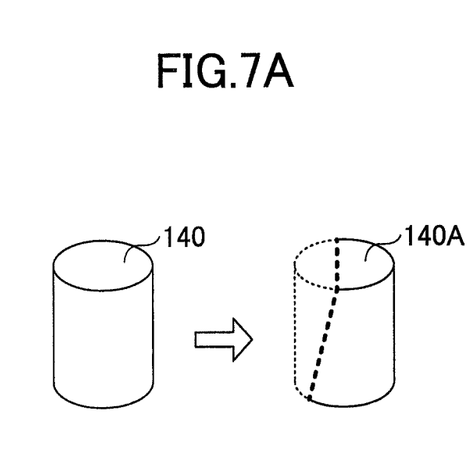
FIGS. 7A and 7B are diagrams for explaining etching of the magnetic particles.
Figure 7B:
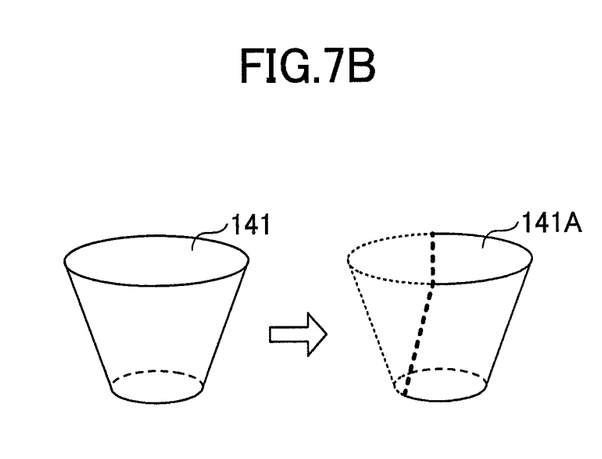

FIGS. 7A and 7B are diagrams for explaining etching of the magnetic particles. FIG. 7A illustrates the magnetic particle 140 having the cylindrical shape, and FIG. 7B illustrates the magnetic particle 141 having the inverted truncated cone shape. As may be seen from FIGS. 7A and 7B, when the recording layer 14 is removed by the dry etching in the step S3 as illustrated in FIGS. 4B and 4C, the magnetic particle is partially etched (that is, removed) at an etching boundary. The volume of the magnetic particle 140 having the cylindrical shape is greatly reduced to a magnetic particle 140A when partially etched at the etching boundary, as indicated by dotted lines in FIG. 7A. On the other hand, the volume of the magnetic particle 141 having the inverted truncated cone shape will not be greatly reduced and a magnetic particle 141A may maintain a relatively large volume when partially etched at the etching boundary, as indicated by dotted lines in FIG. 7B. Hence, the inverted truncated cone shape of the magnetic particle 141 may suppress undesirable effects of the thermal instability at the etching boundary, that is, a boundary (or edge) between the recording layer 14 and the non-magnetic material 16.

The volumes of the magnetic particle 141 illustrated in FIG. 6B and the magnetic particle 141A illustrated in FIG. 7B are large compared to the volumes of the magnetic particle 141 illustrated in FIG. 6A and the magnetic particle 140A illustrated in FIG. 7A. For this reason, the magnetic anisotropy energy Ku per unit volume of the magnetic particles 141 and 141A can be made relatively small. Consequently, information can be recorded on the magnetic recording medium 1 having the recording layer 14 formed by the magnetic particles 141 and 141A using a relatively small recording magnetic field, as is evident from a relationship Hk=2Ku/Ms, where Hk denotes the recording magnetic field required to record the information on the magnetic recording medium 1 and Ms denotes a saturation magnetic field. Therefore, if the magnetic particle 141 having the inverted truncated cone shape were etched at the same etching rate as the magnetic particle 140 having the cylindrical shape, the volume of the residual magnetic particle 141A would become larger than that of the residual magnetic particle 140A, and it may be seen that the magnetic recording medium 1 having the recording layer 14 formed by the magnetic particles 141 with the inverted truncated cone shape has a strong resistance to thermal instability when compared to a magnetic recording medium having a recording layer formed by the magnetic particles 140 with the cylindrical shape.

Figure 8A:
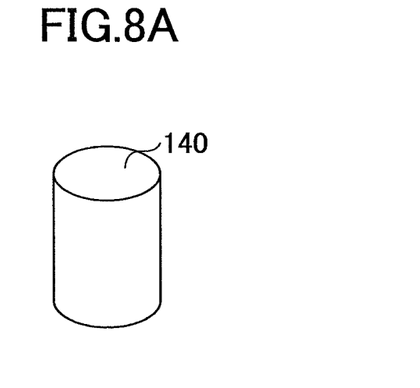
FIGS. 8A and 8B are diagrams for explaining shapes of magnetic particles in a case where the recording layer is relatively thin.
Figure 8B:
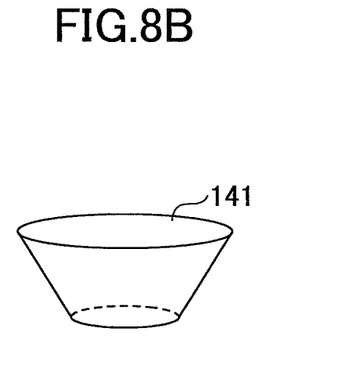

FIGS. 8A and 8B are diagrams for explaining shapes of magnetic particles in a case where the recording layer 14 is relatively thin. FIG. 8A illustrates the magnetic particle 140 having the cylindrical shape, and FIG. 8B illustrates the magnetic particle 141 having the inverted truncated cone shape. As may be seen from FIGS. 8A and 8B, although the areas of the lower surfaces of the magnetic particles 140 and 141 are the same, the volume of the magnetic particle 141 can be made larger than that of the magnetic particle 140 even if the film thickness of the recording layer 14 is relatively small. In other words, the film thickness of the recording layer 14 can be made small when compared to the recording layer formed by the magnetic particles 140, because the volume of the magnetic particles 141 is larger than that of the magnetic particles 140. If the volumes of the magnetic particles 140 and 141 were the same and the upper and lower surface diameters of the magnetic particle 141 having the inverted truncated cone shape were 10 nm and 7.5 nm, respectively, the recording layer 14 formed by the magnetic particles 141 having the inverted truncated cone shape can be reduced to a film thickness of 12.5 nm. When the recording layer 14 is relatively thin, it is not only possible to reduce the etching amount when partially removing the recording layer 14, but it is also possible to reduce the amount of the non-magnetic material 16 used to fill the groove of the pattern formed on the recording layer 14. As a result, the productivity of the magnetic recording layer 1 can be improved. Therefore, it is possible to shorten an etching time (or patterning time) required to etch (or pattern) the recording layer 14 described above in conjunction with FIG. 4B, and to shorten a time required to fill the grooves of the patterns on the recording layer 14 by the non-magnetic material 16 as described above in conjunction with FIGS. 4D and 4E.

Figure 9:
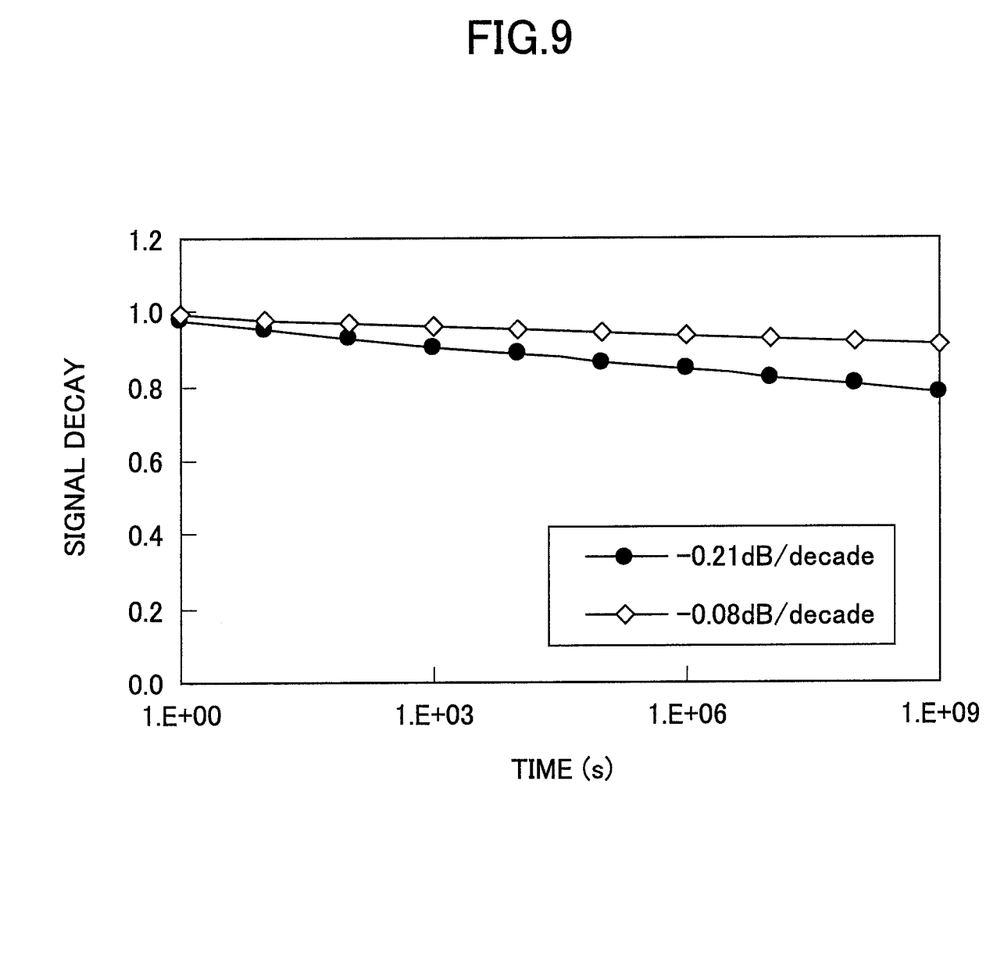
FIG. 9 is a diagram illustrating measured results of magnetization stability of the recording layer in a land region for data, with respect to a sample and a comparison example.

The present inventor has studied the resistance of the magnetic recording medium 1 to thermal instability, by actually recording (or writing) data on the magnetic recording medium 1 that is fabricated by the above described medium fabricating method and reproducing (or reading) the recorded data from the magnetic recording medium. In a sample Smp of this embodiment, the film thickness of the recording layer 14 was 15 nm and the lower surface diameter of the magnetic particle 141 having the inverted truncated cone shape was 8 nm. On the other hand, a comparison example Cmp had a structure similar to that of the magnetic recording medium 1, but the film thickness of the recording layer 14 was 15 nm and the upper and lower surface diameters of the magnetic particle 140 having the cylindrical shape was 8 nm. FIG. 9 is a diagram illustrating measured results of magnetization stability of the recording layer 14 in the land region for data, with respect to the sample Smp and the comparison example Cmp. In FIG. 9, the ordinate indicates a normalized signal decay in arbitrary units, the abscissa indicates the time in seconds (s), and for example, 1.E+3 represents $1 \times 10^3$. As may be seen from FIG. 9, the signal decay of the comparison example Cmp using the magnetic particles 140 having the cylindrical shape was −0.21 dB/decade as indicated by black circular symbols "•". On the other hand, the signal decay of the sample Smp using the magnetic particles 141 having the inverted truncated cone shape was −0.08 dB/decay as indicated by diamond symbols "◇". Thus, it was confirmed that the signal decay of the sample Smp is greatly improved compared to that of the comparison example Cmp. In other words, it was confirmed that the resistance of the sample Smp to the thermal instability is greatly improved compared to that of the comparison example Cmp.

Next, a description will be given of the reasons why the flatness of the medium surface of the sample Smp is improved compared to that of the comparison example Cmp, by referring to FIGS. 11 through 13C.

Figure 10:
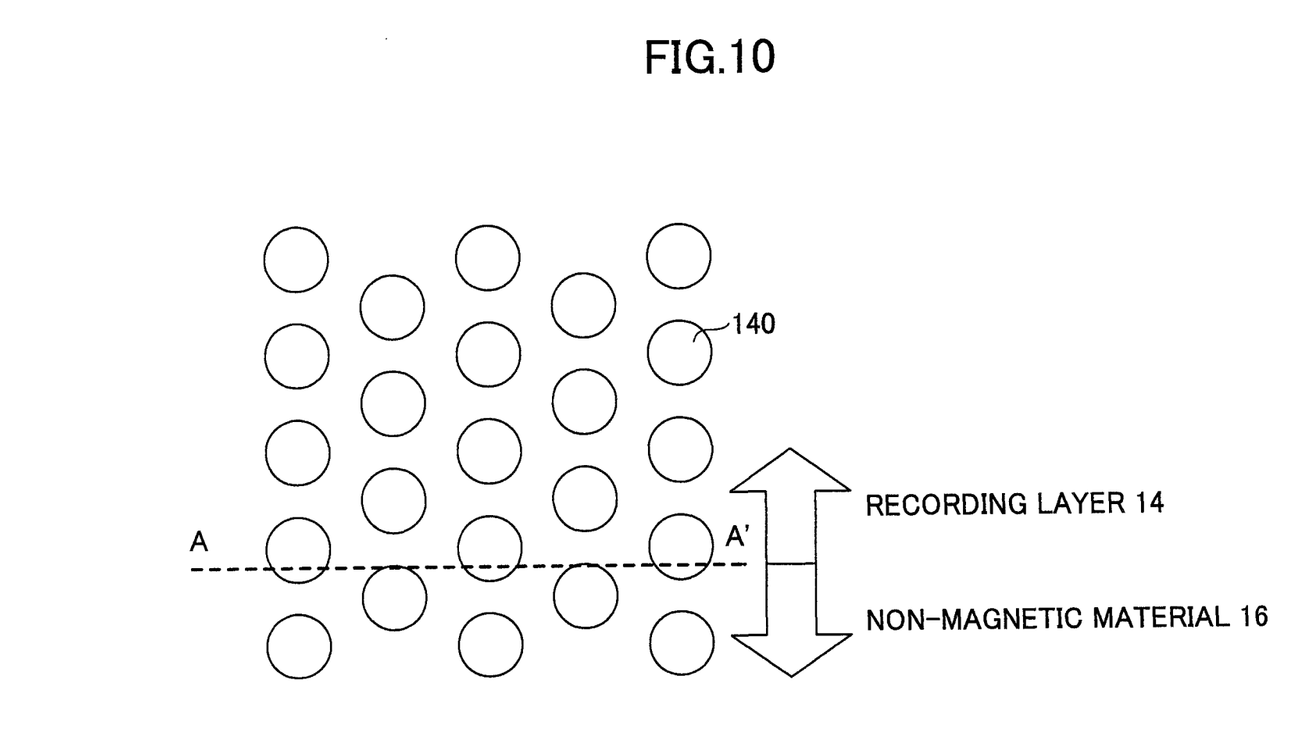
FIG. 10 is a plan view illustrating a medium surface in a case where the magnetic particles have a cylindrical shape.
Figure 11A:
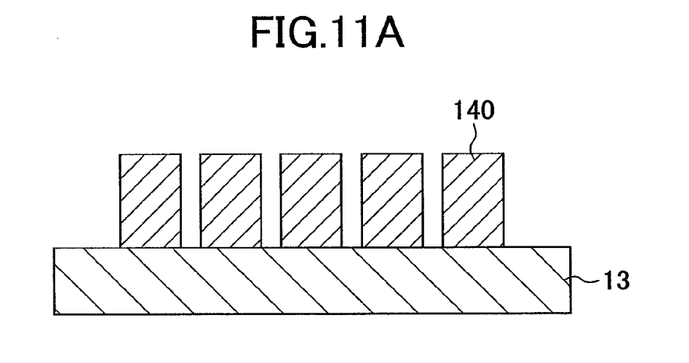
FIGS. 11A through 11C are cross sectional views for explaining a mechanism in which dents are generated on the medium surface.
Figure 11B:
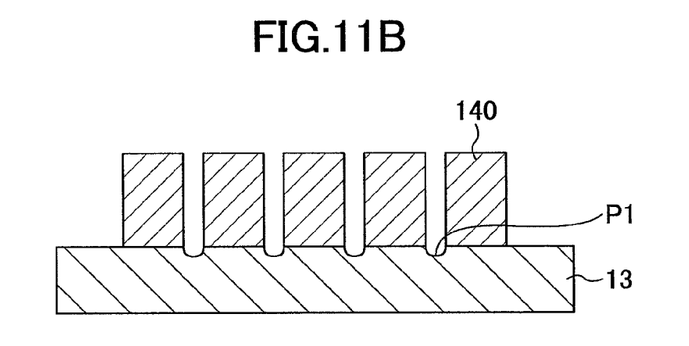
Figure 11C:
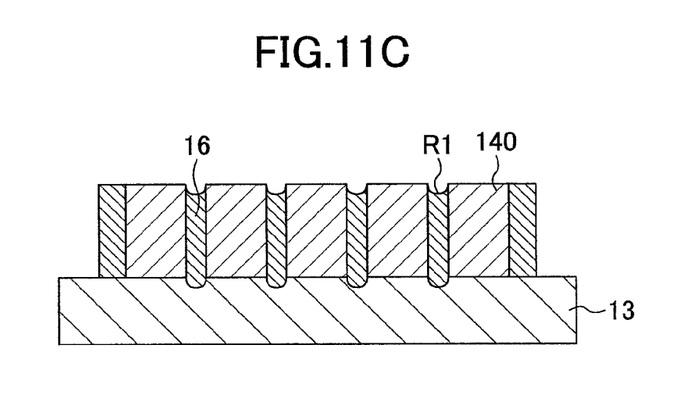

FIG. 10 is a plan view illustrating the medium surface in a case where the magnetic particles have the cylindrical shape. FIGS. 11A through 11C are cross sectional views, along a line A-A' in FIG. 10, for explaining a mechanism in which dents are generated on the medium surface. In FIGS. 10 through 11C, those parts that are the same as those corresponding parts in FIGS. 1 through 4F are designated by the same reference numerals, and a description thereof will be omitted. In FIG. 10, a portion of the recording layer 14 above the line A-A' corresponds to the land region of the comparison example Cmp, and a portion of the non-magnetic material 16 below the line A-A' corresponds to the groove region of the comparison example Cmp. In FIGS. 11A through 11C, the illustration of the resist layer 31 is omitted for the sake of convenience.

FIG. 11A illustrates a state corresponding to that of FIG. 4B, and a state illustrated in FIG. 11B is obtained by patterning the recording layer 14 by etching. FIG. 11B illustrates a state corresponding to that of FIG. 4C. The etching rate of the granular forming oxide forming the recording layer 14 is slightly higher than the etching rate of the magnetic particles 140. Hence, as indicated by P1 in FIG. 11B, a portion of the intermediate layer 13 is etched to thereby form a dent in the intermediate layer 13. For this reason, even after the non-magnetic material 16 fills the groove in the patterned recording layer 14 and the medium surface is planarized as illustrated in FIG. 11C, a dent with a depth on the order of approximately 0.8 nm is generated at the medium surface as indicated by R1. FIG. 11C illustrates a state corresponding to that of FIG. 4E.

Figure 12:
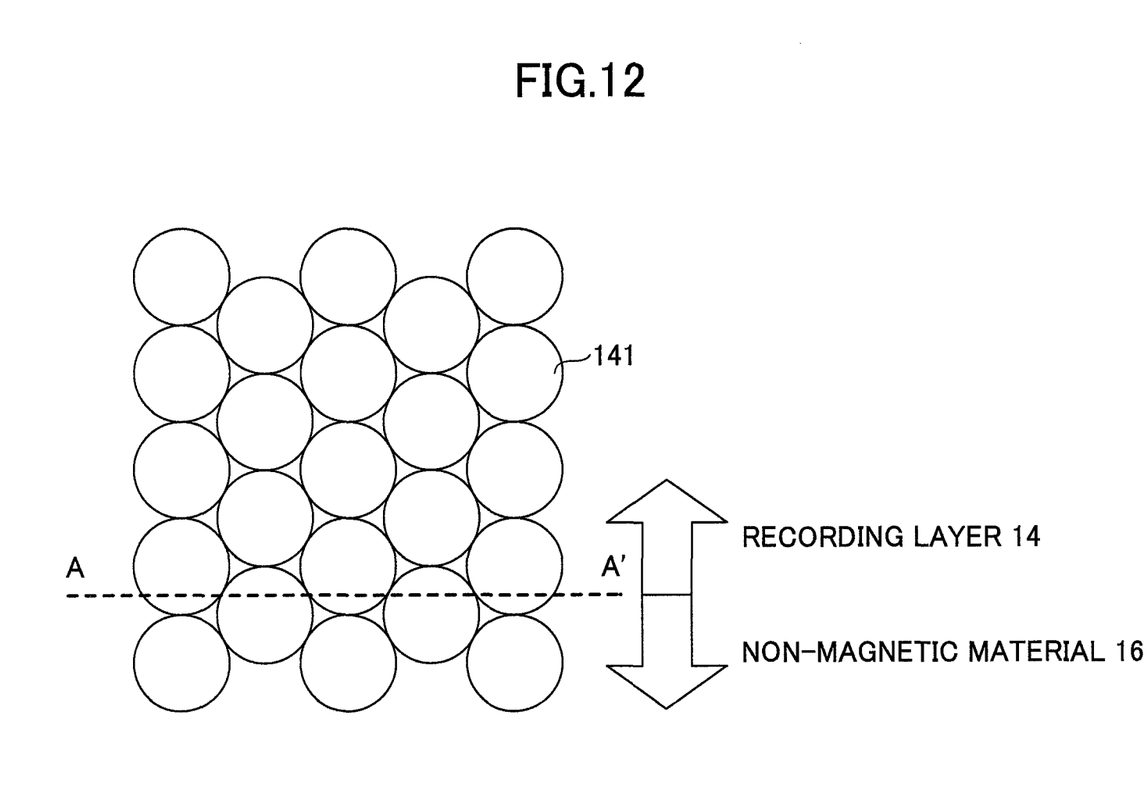
FIG. 12 is a plan view illustrating the medium surface in a case where the magnetic particles have an inverted truncated cone shape.
Figure 13A:
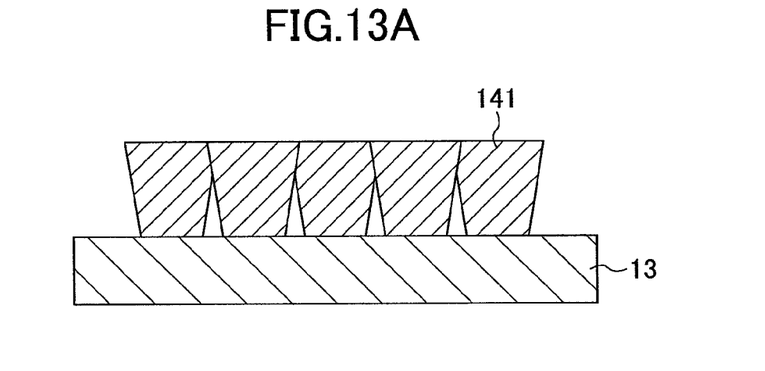
FIGS. 13A through 13C are cross sectional views for explaining a mechanism in which dents are uneasily generated on the medium surface.
Figure 13B:
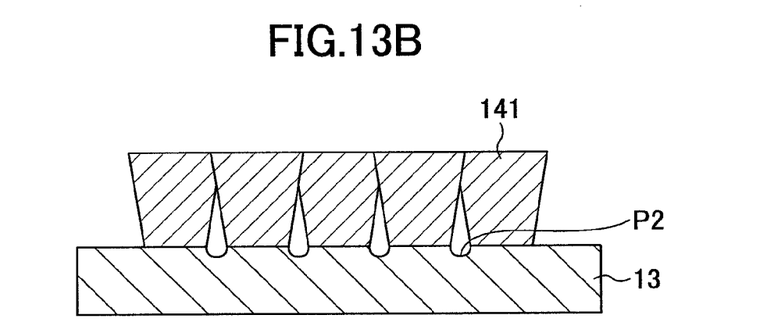
Figure 13C:
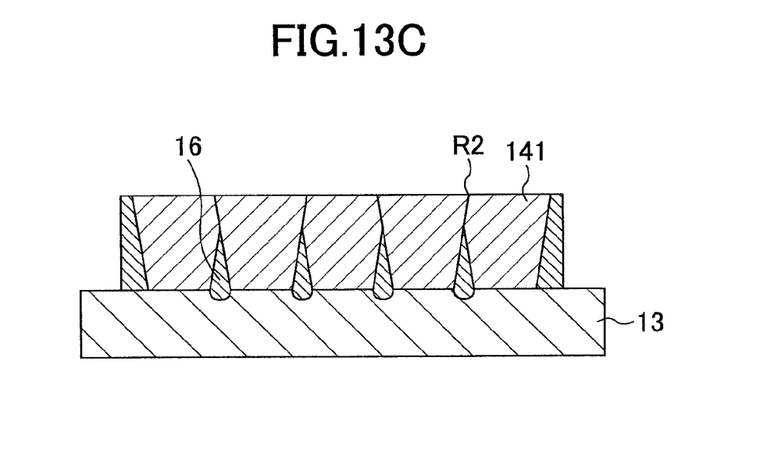

FIG. 12 is a plan view illustrating the medium surface in a case where the magnetic particles have the inverted truncated cone shape. FIGS. 13A through 13C are cross sectional views, along a line A-A' in FIG. 12, for explaining a mechanism in which dents are uneasily generated on the medium surface. In FIGS. 12 through 13C, those parts that are the same as those corresponding parts in FIGS. 1 through 4F are designated by the same reference numerals, and a description thereof will be omitted. In FIG. 12, a portion of the recording layer 14 above the line A-A' corresponds to the land region of the sample Smp, and a portion of the non-magnetic material 16 below the line A-A' corresponds to the groove region of the sample Smp. In FIGS. 13A through 13C, the illustration of the resist layer 31 is omitted for the sake of convenience.

FIG. 13A illustrates a state corresponding to that of FIG. 4B, and a state illustrated in FIG. 13B is obtained by patterning the recording layer 14 by etching. FIG. 13B illustrates a state corresponding to that of FIG. 4C. The etching rate of the granular forming oxide forming the recording layer 14 is slightly higher than the etching rate of the magnetic particles 141. However, as indicated by P2 in FIG. 13B, the intermediate layer 13 is hardly etched and thus, substantially no dent is formed in the intermediate layer 13. FIG. 13B illustrates the dent in the intermediate layer 13 on an enlarged scale as compared to FIG. 11B to make the dent visible in the drawing. Substantially no dent is formed in the intermediate layer 13 because the magnetic particles 141 are closely packed and a gap between the adjacent magnetic particles 141 is extremely small at the upper region of the recording layer 14, as may be seen from FIG. 12. For this reason, after the non-magnetic material 16 fills the groove in the patterned recording layer 14 and the medium surface is planarized as illustrated in FIG. 13C, a dent is unlikely to be formed on the medium surface. In addition, even if a dent is formed on the medium surface as indicated by R2 in FIG. 13C, a depth of this dent will only be on the order of approximately 0.2 nm or less. FIG. 13C illustrates a state corresponding to that of FIG. 4E. Therefore, the flatness of the medium surface of the sample Smp is greatly improved compared to that of the comparison example Cmp.

Figure 14:
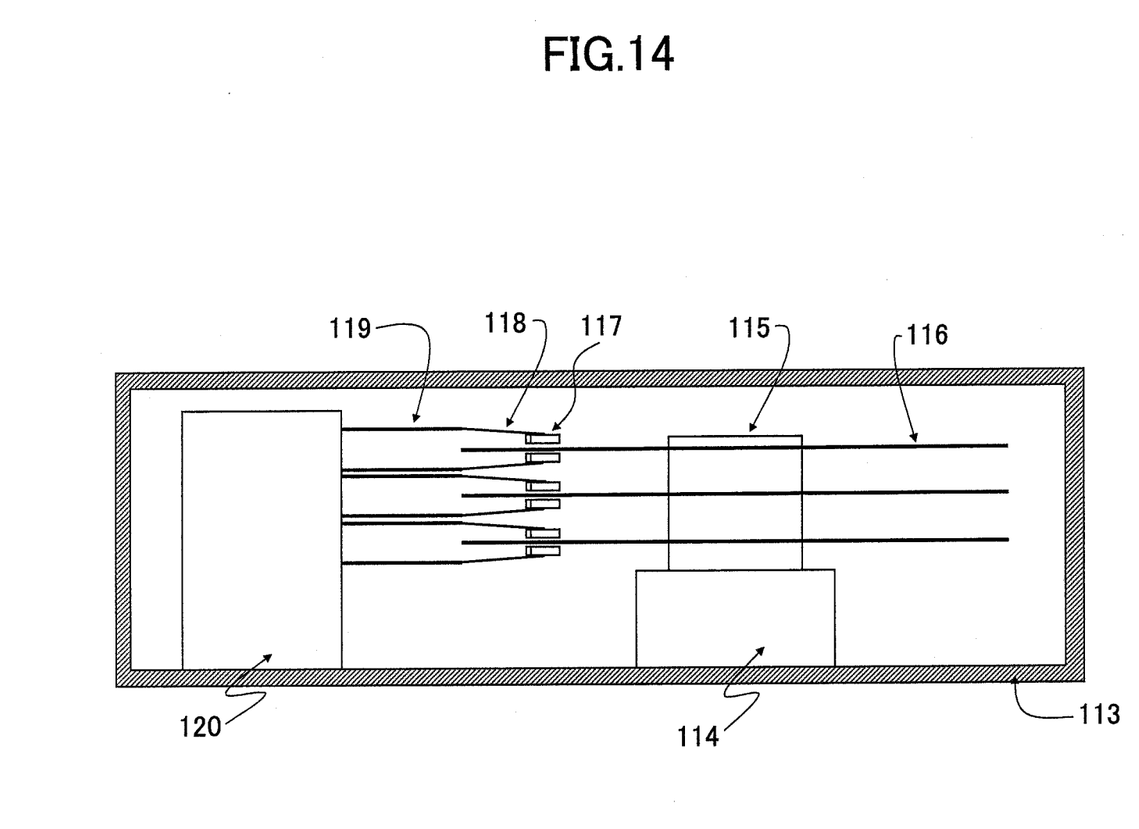
FIG. 14 is a cross sectional view illustrating a portion of a storage medium.

Next, a description will be given of the storage apparatus of this embodiment, by referring to FIGS. 14 and 15. In this embodiment, the storage apparatus is formed by a magnetic disk apparatus or a Hard Disk Drive (HDD). FIG. 14 is a cross sectional view illustrating a portion of the storage medium, and FIG. 15 is a plan view, with a top cover removed, illustrating a portion of the storage apparatus illustrated in FIG. 14.

Figure 15:
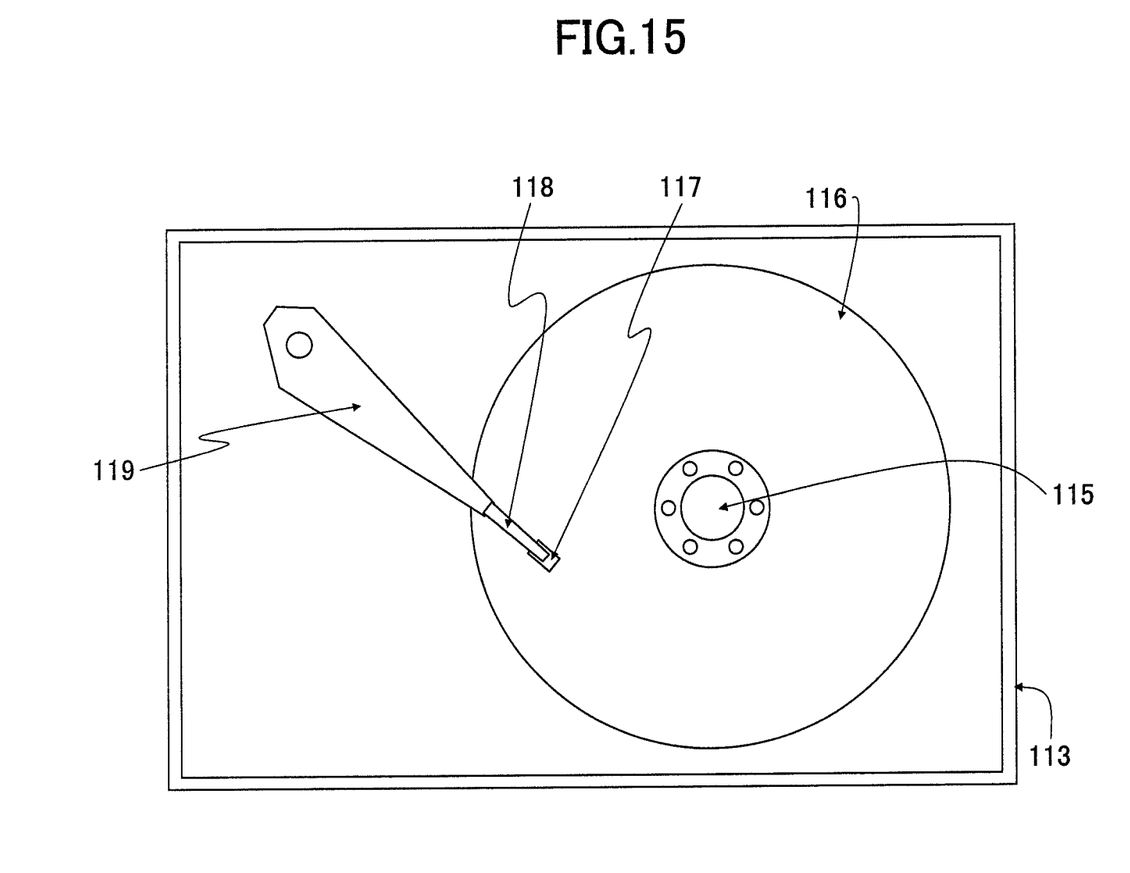
FIG. 15 is a plan view, with a top cover removed, illustrating a portion of the storage apparatus.

In FIGS. 14 and 15, a motor 114 is mounted on a base 113, and the motor 114 rotates a hub 115 on which a plurality of magnetic disks 116 are fixed. The magnetic disk 116 has a structure similar to that of the magnetic recording medium 1 of the embodiment described above. A head part includes a read head, a write head and the like that are fixed on a head slider 117. Information is written on the magnetic disk 116 and the information is read from the magnetic disk 116, by use of the head part. The read head reads the information from the magnetic disk 116, and the write head writes the information on the magnetic disk 116.

The head slider 117 is connected to a suspension 118, and the suspension 118 pushes the head slider 117 in a direction towards a recording surface of the magnetic disk 116. The recording surface of the magnetic disk 116 is provided with a lubricant layer that is formed by a lubricant. At a specific rotational speed of the magnetic disk 116 and a specific rigidity of the suspension 118, the head slider 117 is designed to scan a floating position that is a predetermined floating distance from the recording surface of the magnetic disk 116. The suspension 118 is fixed to a rigid arm 119 that connects to an actuator 120. Hence, information can be written on and read from the magnetic disk 116 in a relatively large area on the magnetic disk 116.

Of course, the number of magnetic disks 116 is not limited to three as illustrated in FIG. 14. The number of magnetic disks 116 provided within the storage apparatus may be one, two or, four or more.

In addition, the magnetic recording medium in this embodiment is not limited to the magnetic disk, and the present invention is similarly applicable to various kinds of magnetic recording media, including magnetic cards.

Further, the present invention is not limited to these embodiments, but various variations and modifications may be made without departing from the scope of the present invention.

What is claimed is:

1. A magnetic recording medium comprising:
   a recording layer having a granular structure in which magnetic particles are dispersed within a non-magnetic base, said recording layer having patterns with grooves formed thereon, wherein the magnetic particles are packed together so as to be substantially contiguous; and
   a non-magnetic material embedded in the grooves of the patterns on the recording layer,
   wherein the magnetic particles have an inverted truncated cone shape with a diameter larger in an upper region of the recording layer than in a lower region of the recording layer.

2. The magnetic recording medium as claimed in claim 1, further comprising:
   an intermediate layer having one of a stacked structure in which NiFe and Ru are successively stacked and a stacked structure in which Ta and Ru are successively stacked,
   wherein the recording layer is provided on the intermediate layer, and the non-magnetic material within the grooves is in contact with the intermediate layer.

3. The magnetic recording medium as claimed in claim 2, further comprising:
   a soft magnetic layer formed by one of a Co-based amorphous material and a Fe-based amorphous material,
   wherein the intermediate layer is provided on the soft magnetic layer.

4. The magnetic recording medium as claimed in claim 3, wherein:
   the magnetic recording medium forms a disk-shaped discrete track medium; and
   the recording layer and the non-magnetic material are formed concentrically and are arranged alternately along a radial direction of the magnetic recording medium.

5. The magnetic recording medium as claimed in claim 1, wherein:
   the magnetic recording medium forms a disk-shaped discrete track medium; and
   the recording layer and the non-magnetic material are formed concentrically and are arranged alternately along a radial direction of the magnetic recording medium.

6. The magnetic recording medium as claimed in claim 1, wherein the non-magnetic base is separate from the non-magnetic material.

7. A storage apparatus comprising:
   a magnetic recording medium; and
   a head configured to write information on and to read information from the magnetic recording medium,
   said magnetic recording medium comprising:
   a recording layer having a granular structure in which magnetic particles are dispersed within a non-magnetic base, said recording layer having patterns with grooves formed thereon, wherein the magnetic particles are packed together so as to be substantially contiguous; and
   a non-magnetic material embedded in the grooves of the patterns on the recording layer,
   wherein the magnetic particles have an inverted truncated cone shape with a diameter larger in an upper region of the recording layer than in a lower region of the recording layer.

8. The storage apparatus as claimed in claim 7, wherein the magnetic recording medium further comprises:
   an intermediate layer having one of a stacked structure in which NiFe and Ru are successively stacked and a stacked structure in which Ta and Ru are successively stacked,
   wherein the recording layer is provided on the intermediate layer, and the non-magnetic material within the grooves is in contact with the intermediate layer.

9. The storage apparatus as claimed in claim 8, wherein the magnetic recording medium further comprises:
   a soft magnetic layer formed by one of a Co-based amorphous material and a Fe-based amorphous material,
   wherein the intermediate layer is provided on the soft magnetic layer.

10. The storage apparatus as claimed in claim 9, wherein:
    the magnetic recording medium forms a disk-shaped discrete track medium; and
    the recording layer and the non-magnetic material are formed concentrically and are arranged alternately along a radial direction of the magnetic recording medium.

11. The storage apparatus as claimed in claim 7, wherein:
    the magnetic recording medium forms a disk-shaped discrete track medium; and
    the recording layer and the non-magnetic material are formed concentrically and are arranged alternately along a radial direction of the magnetic recording medium.

12. The storage apparatus as claimed in claim 7, wherein the non-magnetic base is separate from the non-magnetic material.

\* \* \* \* \*